United States Patent [19]

Shet

[11] Patent Number: 5,522,967
[45] Date of Patent: Jun. 4, 1996

[54] SULFONATED CELLULOSE AND METHOD OF PREPARATION

[75] Inventor: Ramakant T. Shet, Neenah, Wis.

[73] Assignee: Kimberly-Clark Corporation, Neenah, Wis.

[21] Appl. No.: 250,186

[22] Filed: May 27, 1994

[51] Int. Cl.⁶ .................................................. D21H 11/20
[52] U.S. Cl. ........................... 162/9; 162/146; 162/157.6; 8/116.1
[58] Field of Search ................................. 162/9, 83, 84, 162/85, 157.6, 177, 182, 146; 8/116.1, 120

[56] References Cited

U.S. PATENT DOCUMENTS

| | | | |
|---|---|---|---|
| 1,846,093 | 2/1932 | Dils . | |
| 4,082,743 | 4/1978 | Hearon et al. | 536/30 |
| 4,242,506 | 12/1980 | Schweiger | 536/59 |
| 4,818,598 | 4/1989 | Wong | 428/284 |
| 5,089,089 | 2/1992 | Beaulieu . | |

FOREIGN PATENT DOCUMENTS 1057440  5/1959  Germany ........................... 162/157.6

OTHER PUBLICATIONS

Allan, G. G. and Reif, W. M., "Fiber Surface Modification", *Svensk Papperstidning arg.* 74 (1971), pp. 563–570.

Anderson, R., "Relation Between Compression Stiffness and Costs for Wet Stiff Corrugated Boards", *Svensk Papperstidning*, Nr. 7, (1976), pp. 212–214.

Stamm, A. J. "Dimensional Stabilization of Paper by Catalyzed Heat Treatment and Cross–Lonking with Formaldehyde", *TAPPI*, vol. 42, No. 1 (1959), pp. 44–50.

Neogi, A. N. and Jensen, J. R., "Wet Strength Improvement Via Fiber Surface Modification", *TAPPI*, vol. 63, No. 8 (1980), pp. 86–88.

Walecka, J. A., "An Investigation of Low Degree of Substitution Carboxymethylcelluloses", *TAPPI*, vol. 39, No. 7 (1956), pp. 458–463.

Atack, D., Heitner, C. and Karnis, A. "Ultra–High Yield Pulping of Eastern Black Spruce, Part 2", *Svensk Papperstidning*, Nr. 5 (1980), pp. 133–141.

Heitner, C. and Atack, D. "Ultra–High Yield Pulping of Eastern Black Spruce", *Svensk Papperstidning*, (1982), pp. R 78—R 86.

*Primary Examiner*—Peter Chin
*Attorney, Agent, or Firm*—Gregory E. Croft; John R. Schenian

[57] ABSTRACT

Disclosed is a method for the surface modification of cellulose fiber and the resulting product, sulfonated cellulose. Cellulose is first oxidized, preferably with sodium metaperiodate ($NaIO_4$), to form dialdehyde oxycellulose, which is then reacted with sodium bisulfite ($NaHSO_3$) to produce sulfonated cellulose. Sulfonation of the cellulose fiber significantly increases the dry and wet tensile strength as well as the wet strength:dry strength ratio, making this modified cellulose fiber extremely useful in a wide variety of paper products requiring a combination of good strength in both wet and dry applications.

34 Claims, No Drawings

5,522,967

SULFONATED CELLULOSE AND METHOD OF PREPARATION

BACKGROUND OF THE INVENTION

Wet strength is a very important property for many grades of paper that are exposed to water during use. Grades of paper usually requiring wet strength include: bag, tag, toweling, tissue, map papers, paper pattern, napkins, ice cube bags, diaper liners, diaper wrap sheets, feminine napkin wrap sheets, disposable hospital bed pads, poster papers, filter papers, and many other grades of paper. Paper not treated for wet strength typically has 3–7% of its original dry strength available when tested while wet. Because of the need for paper products that retain some of their strength when soaked in water, chemical wet strength resins have been developed which produce paper products typically retaining 20–40% of their dry strength. In the paper industry, papers having wet tensile strengths of more than 15% of the original dry tensile strength are considered to be wet strength papers.

It is also possible to further subdivide wet strength papers based on the permanence of their strength when wet. Paper which has not been treated typically loses its strength within seconds of being soaked in water, while with some wet strength chemicals the rate of wet strength loss during soaking is slowed. Such papers are said to possess temporary wet strength. Other chemicals provide a longer lasting effect and are said to impart permanent wet strength, even though the wet strength is not fully permanent.

In order to achieve wet strength, wet strength resins have been developed which are, in general, chemically reactive, water-soluble polymers that are added at the wet end of the paper machine. They are typically quite expensive and are prone to a host of problems. The first resins to become popular in use for improving wet strength were the aminoplast resins, urea-formaldehyde and melanin-formaldehyde. These resins are thermosetting and require heat and low pH to properly cure. They had adverse effects on brightness and absorbency, and the low pH was corrosive to the equipment. They have fallen out of common use because of environmental problems associated with their formaldehyde content/release. More recently, epoxidized polyamide resins (PAE) and glyoxalated polyacrylamide resins have been developed and have found generally good acceptance in the paper industry. They can be used in neutral or alkaline conditions and, while the epoxidized polyamide resins produce a permanent wet strength, the glyoxalated polyacrylamide resins provide only temporary wet strength, although some increase in dry strength is also achieved. Despite the significant advances that these resins represent, there are still a great many problems associated with their usage including high cost, limited storage life, expensive addition systems, pH control on the paper machine, curing time, and sensitivity to other chemicals. In addition, the epoxidized polyamide resins have environmental concerns because of the absorbable organic halogen (AOX) emissions, while the glyoxalated polyacrylamide resins are not suitable for all uses because of the temporary nature of their wet strength development.

In this age of environmental awareness, the ideal wet strength agents are not currently available. Environmental concerns continue to influence research to develop new products that are more biodegradable and more compatible to a wide variety of ecological considerations while still accomplishing the task of providing suitable wet strength in the finished product.

SUMMARY OF THE INVENTION

It has now been discovered that cellulose fiber can be modified to provide the wet strength function of a product without the addition of any separate chemically reactive polymer, although these wet strength resins may be used along with the modified cellulose fiber if desired. In accordance with this invention, the sulfonation of cellulose fibers results in significant improvements to the wet tensile strength and the dry tensile strength exhibited by paper sheets made with the treated fibers of this invention. The wet tensile strength:dry tensile strength ratio (sometimes referred to as the "wet over dry" ratio) can be increased to from about 15 to about 40 percent without the addition of any other traditional wet strength agents.

Hence in one aspect, the invention resides in a method of making sulfonated cellulose fiber comprising the steps of (a) oxidizing cellulose fiber with an oxidizing agent to form aldehydo cellulose; and (b) sulfonating the oxidized cellulose with a sulfonation agent to form sulfonated cellulose.

In another aspect, the invention resides in a sulfonated cellulose fiber. The sulfonated cellulose can be characterized by a degree of substitution of about 0.005 or greater, more specifically from about 0.01 to about 0.1, and still more specifically from about 0.01 to about 0.04. As used herein, the "degree of substitution" (DS) is the moles of sulfonic groups per mole of glucose unit in the cellulose. The maximum DS that can be obtained is 2 when both hydroxyl groups in the $C_2$ and $C_3$ position in the glucose residue are oxidized to dialdehyde and subsequently converted to sulfonates.

As used herein, "sulfonated cellulose fiber", is not to be confused with "sulfonated pulp", the latter being the basis for the many varieties of sulfite pulping processes and most of the CTMP (chemithermomechanical) pulping processes. When sulfonating pulp, it is the lignin portion of the pulp that is sulfonated rather than sulfonation of the cellulose portion. Sulfonation of lignin serves to soften the lignin and/or make it soluble under suitable conditions in the form of sulfonated lignin or a ligno-sulfonate. In the case of CTMP or its variations, the objective of the sulfonation has been to soften the lignin by sulfonation so that individual fibers can be separated from the mass with minimal damage to the fibers. The fiber separation is accomplished by mechanical means with thermal assistance to the sulfonation in softening the lignin binding individual fibers together. No attempt is made to dissolve or remove the lignin. In full chemical pulping by the sulfite process or one of its variations, the lignin is sulfonated under suitable conditions so that the lignin is dissolved and removed from the fiber as a ligno-sulfonate.

The oxidation and subsequent sulfonation of cellulose in accordance with this invention can be carried out on a wide variety of raw materials including pulps derived from both woody and non-woody plants, coniferous as well deciduous trees, and by a variety of pulping processes including Kraft, Soda, a variety of sulfite processes, and CTMP. Eucalyptus fibers are particularly advantageous as a feed material in that they have bulk in addition to exhibiting increased strength resulting from the method of this invention. Secondary fiber obtained by recycling waste paper would also be suitable as a raw material for oxidation and sulfonation. The oxidation/sulfonation can also be carried out on any of the abovementioned pulps that have been mechanically refined prior to the oxidation/sulfonation process. Sulfonation of prerefined pulps has the advantage of producing even higher wet and dry strength levels and wet over dry ratios than a similar treatment carried out on pulp which has not been refined. Treating pulp that has never been dried provides a greater improvement in wet strength development than treating pulp which has been previously dried.

DETAILED DESCRIPTION OF THE INVENTION

The chemical reactions taking place in carrying out the method of this invention are as follows:

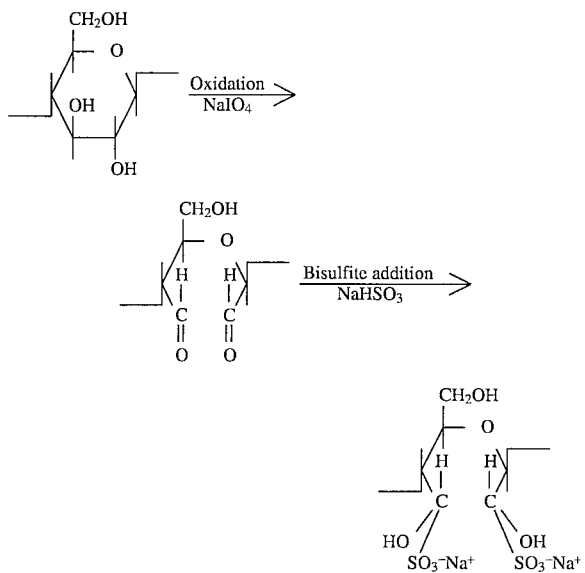

With regard to the oxidation reaction, there are a great many ways in which the chain units in cellulose can be oxidized. However, most oxidants are unspecific in their mode of attack. Suitable oxidants for purposes of this invention include, without limitation, sodium metaperiodate, sodium paraperiodate, periodic acid, sodium hypochlorite, hydrogen peroxide, ozone, potassium dichromate, potassium permanganate, and sodium chlorite. Periodate ions react with the cellulose without destroying its fibrous nature and result primarily in the oxidative scission of 1, 2 - diols to primarily produce dialdehyde oxycellulose under proper conditions. For this reason the preferred oxidizing agents are the periodates, such as sodium metaperiodate (NaIO$_4$). Periodate oxidation is widely used and widely known in carbohydrate chemistry and is certainly not novel in itself. Periodate oxycelluloses are extremely sensitive to alkali and although some wet strength is developed in the oxidation stage, it is very fugitive and goes away at the first exposure to an alkaline pH. The sulfonation of the periodate-oxidized cellulose results in paper sheets having much higher wet tensile strengths and improved stability and permanence. As an example, at a pH of about 11, handsheets made with oxidized cellulose fibers exhibited a wet strength of only about 390 grams per inch, whereas handsheets made with the sulfonated cellulose fibers exhibited a wet strength of about 1030 grams per inch.

The temperature of the oxidation reaction can be from about 20° C. to about 55° C., more specifically from about 30° C. to about 50° C., and most specifically from about 40° C. to about 45° C. At temperatures below 20° C., the reaction proceeds too slowly to be practical. At temperatures greater than 55° C., the oxidation of cellulose proceeds too fast and causes nonuniformity of the product and decomposition of the periodate.

The pH of the oxidation reaction can preferably be from about 3 to about 4.6. At higher pH, the sodium metaperiodate is converted to insoluble paraperiodate.

When using sodium metaperiodate as the oxidation agent, the upper concentration of sodium metaperiodate is limited by its solubility in water, which is 14.44 grams per 100 milliliters at 25° C. The maximum concentration of sodium metaperiodate which can therefore be achieved is about 0.67M. On the other hand, at concentrations below about 0.005M the rate of reaction is too slow for the process to be economically feasible. Preferred concentrations are from about 0.01M to about 0.2M. At higher concentrations, although the reaction will proceed faster toward the desired degree of substitution, the shorter treatment time is likely to result in non-uniformity of the substitution.

With regard to the sulfonation reaction, suitable sulfonation reagents include, without limitation, alkali bisulfite, such as sodium bisulfite, and a combination of sodium hydroxide and sulfur dioxide. A preferred reagent is sodium bisulfite (NaHSO$_3$). The concentration of sodium bisulfite is not critical provided there is an excess over the stoichiometric amount required.

When using sodium bisulfite as the sulfonation agent, the concentration of the sodium bisulfite can be from about 1 to about 10 weight percent based on the weight of the fiber, more specifically from about 2 to about 5 weight percent.

The temperature of the sulfonation reaction can be from about 25° C. to about 90° C. or greater, more specifically from about 30° to about 45° C.

The pH of the sulfonation reaction can be from about 3 to about 4.5. Although the reaction proceeds faster at lower pH levels, sulfur dioxide will be lost unless the reaction is carried out under pressure. Also, at high temperatures and acidic pH, cellulose is likely to undergo hydrolytic degradation.

A preferred method of making sulfonated cellulose is to oxidize cellulose pulp with sodium metaperiodate at a concentration above 0.01M for over one hour at room temperature or above. The aldehydo cellulose or dialdehyde oxycellulose thus produced is then preferably washed with the water to remove reaction products. The oxidized cellulose fibers are then reacted with a greater than 0.3 percent aqueous solution of sodium bisulfite at ambient temperature or higher for about 1 hour at a pH of about 4.5. The product is then washed again to remove unreacted bisulfite and can be used as such in a never-dried condition, or it may be partially dried by conventional means for shipment or storage.

The oxidation/sulfonation of cellulose results in significant improvements in the wet and dry tensile strength and provides high wet over dry tensile ratios for the cellulose pulp so treated. The wet and dry tensile strengths of cellulose pulp can be further enhanced by refining the cellulose pulp prior to the oxidation/sulfonation. Such refining also increases the wet over dry tensile ratio significantly. When used as a pretreatment, refining serves to bring about external and internal fibrillation of the fibers. This increases the surface area of the fibers and also increases accessibility of the fibrils and cellulose chains to oxidation/sulfonation. These factors contribute to the observed increase in wet strengths which can be extremely useful in the manufacture of a wide variety of paper products such as tissue and toweling, board, paper bags, wet wipes, and tissue wraps in personal care products and the like.

EXAMPLES

Example 1

Bleached southern pine softwood kraft pulp (SKP) containing 20 weight percent southern hardwood kraft pulp was used as the cellulose pulp. 100 grams of the pulp was oxidized by slurrying the pulp with 2000 milliliters of 0.05M sodium metaperiodate solution at ambient temperature for 1 to 6 hours. (The reaction time with the oxidizing agent was varied from 1 to 6 hours to alter the sulfonic content and degree of substitution.) At the end of the oxidation reaction, the pulp was washed with distilled water to free it from unreacted reagents and by-products. For this washing step, water having a pH of 8 or greater should be avoided because dialdehyde oxycellulose degrades at alkaline pH. The significant product of the oxidation step was dialdehyde oxycellulose.

The resulting oxidized pulp was then treated with 2000 milliliters of a 5 percent aqueous solution of sodium bisulfite at 60° C. for 3 hours. This amount of sodium bisulfite is far in excess of the stoichiometric amount required for sulfonation. The pH of the reaction solution was approximately 4.5. The sulfonated pulp was thoroughly washed with distilled water to remove unreacted bisulfite.

Table I illustrates changes in level of sulfonation with changes in oxidant reaction time. The sulfur content of the treated pulps was determined by elemental sulfur analysis and is expressed as a weight percent of the pulp. The sulfonic content (percent) is 2.5 times the percent sulfur content, while the DS is 0.05 times the percent sulfur content. In addition to elemental sulfur analysis, energy dispersive x-ray (EDX) analysis was used to confirm the presence of sulfur in the sulfonated pulps.

TABLE 1

Sulfonic Content of SKP

| Sample No. | Time of Treatment (Oxidation) | Time of Treatment (Sulfonation) | Sulfur Content (Percent) | Sulfonic Content (Percent) | Degree of Substitution (DS) |
|---|---|---|---|---|---|
| 1 | 1 hour | 3 hours | 0.4 | 1.0 | .02 |
| 2 | 3 hour | 3 hours | 0.56 | 1.4 | .03 |
| 3 | 6 hours | 3 hours | 1.25 | 3.1 | .06 |

The results show that only 1 to 3 percent of total hydroxyl groups in carbon 2 and carbon 3 in the beta-glucose units of the cellulose were oxidized.

Example 2

The same pulp used in Example 1 was sulfonated to various levels of sulfur content by varying oxidation time and periodate concentration. Specifically, the periodate concentrations and oxidation times were as follows for Table 2: Sample No. 2, 0.02M and 1 hour; Sample No. 3, 0.05M and 1 hour; Sample No. 4, 0.05M and 3 hours; Sample No. 5, 0.05M and 6 hours; and Sample No. 6, 0.05M and 14 hours. Otherwise the method of making the sulfonated cellulose was the same as that of Example 1.

The pulp was then converted into handsheets, which were prepared by soaking 50 grams of pulp in 1950 grams of distilled water for five minutes. The slurry was then beaten in a British Pulp Disintegrator at 3000 rpm for 5 minutes. The resulting slurry was made up to 8 liters with distilled water. 450 milliliters of this well-mixed slurry was used for making a 8.5 inches ×8.5 inches handsheet in a Valley Ironwork mold. Tap water was used in the rest of the operation. Handsheets were pressed in a press at a pressure of 75 pounds per square inch for 1 minute, dried over a steam dryer for 2 minutes, and finally dried in an oven at about 105° C. to a constant weight. The handsheets were then conditioned for at least 48 hours in a room maintained at a constant relative humidity and at a constant temperature in accordance with TAPPI 402.

The handsheet properties are reported in TABLE 2. The sulfur content is expressed as weight percent. The basis weight was determined by a mean of 5 measurements of handsheet size and weight and is expressed as grams per square meter. The caliper (thickness) of the handsheets was measured with a TMI caliper measuring device and is expressed as inches per single handsheet. The dry and wet tensile strengths were determined using an Instron Model 1122 in accordance with TAPPI 494, except the gage length was 5 inches and the cross head speed was 0.5 inches per minute. Tensile strengths are reported in grams per inch of sample width. Tear is the tear strength reported in grams-force. Porosity is the Frazier Porosity reported in cubic feet per minute per square foot. These values are normalized to a basis weight of 60 grams per square meter.

TABLE 2

Handsheet Properties at Various Sulfur Contents

| Sample No. | Sulfur Content | Basis Wt. | Caliper | Dry Tensile | Wet Tensile | Wet/Dry Tensile | Tear | Porosity |
|---|---|---|---|---|---|---|---|---|
| Control |  | 62.3 | .0083 | 921 | 64 | 9 | 27.5 | 632 |
| 2 | .14 | 65.0 | .0089 | 1646 | 342 | 21 | 42.9 | 583 |
| 3 | .28 | 62.6 | .0086 | 2520 | 669 | 27 | 54.7 | 530 |
| 4 | .50 | 63.1 | .0077 | 4068 | 1031 | 25 | 60.3 | 434 |
| 5 | .64 | 64.2 | .0070 | 5170 | 1463 | 28 | 54.3 | 364 |
| 6 | .68 | 64.8 | .0065 | 7012 | 1936 | 28 | 47.0 | 276 |

Table 2 clearly shows the effects of increasing sulfur and sulfonic levels on the wet and dry tensile properties of the handsheets. Dry tensile strengths are increased by a factor of about 10 while wet tensile strengths are increased by a factor of 30 with a wet over dry tensile ratio of 28% being achieved at a sulfur content of 0.64%.

Examples 3 and 4

Table 3 and Table 4 illustrate the effects of refining on sulfonated cellulose fiber. In Table 3, the measured properties are for handsheets made from sulfonated cellulose fiber from Example 2 that was subsequently refined in a PFI mill for up to 120 seconds. In Table 4, the measured properties are for handsheets made from pulp which was refined in a PFI mill for up to 120 seconds and then oxidized/sulfonated as described in Examples 1 and 2.

Samples 1–4 in Table 3 were unsulfonated controls. The reaction conditions for Samples 5–8 were: oxidation- 0.05M $NaIO_4$, ambient temperature, 1 hour; sulfonation- 5% sodium bisulfite solution, 3 hours, 60° C. For samples 9–12, the reaction conditions were the same, except the oxidation reaction time was 3 hours.

As used in the tables, the sulfur content is expressed as weight percent. The beating time is expressed in seconds. The Freeness is the Canadian Standard Freeness, expressed in cubic centimeters. The Bulk is expressed as cubic centimeters per gram. Wet and Dry Tensile strengths are expressed as grams per inch of sample width. These values are normalized for a basis weight of 60 grams per square meter. The Wet Tensile/Dry Tensile ratio is expressed as percent. The Wet and Dry Stretch are expressed as percent.

Tables 3 and 4 show that wet tensile and the wet over dry tensile ratio are significantly improved if the pulp is refined first and then oxidized/sulfonated rather than oxidizing/sulfonating the pulp and thereafter refining it. It will be appreciated that the foregoing examples, given for purposes of illustration, are not to be construed as limiting the scope of this invention, which is defined by the following claims and all equivalents thereto.

I claim:

1. A method of making sulfonated cellulose fiber comprising the steps of:
   a) oxidizing cellulose fiber with an oxidizing agent to form aldehydo cellulose; and
   b) sulfonating the oxidized cellulose with a sulfonation agent to form a sulfonated cellulose having a sulfonic group substitution of about 0.005 or greater, wherein the sulfonated cellulose comprises a sulfur atom bonded directly to cellulose.

2. The method of claim 1 wherein the cellulose fiber is washed with water after step (a).

3. The method of claim 1 wherein the oxidizing agent is selected from the group consisting of sodium metaperiodate, sodium paraperiodate, periodic acid, sodium hypochlorite, hydrogen peroxide, ozone, potassium dichromate, potassium permangate and sodium chlorite.

4. The method of claim 1 wherein the oxidizing agent is sodium metaperiodate.

5. The method of claim 1 wherein the oxidation is carried out at a temperature of from about 20° C. to about 55° C.

6. The method of claim 1 wherein the oxidation is carried out at a temperature of from about 30° C. to about 50° C.

7. The method of claim 1 wherein the oxidation is carried out at a temperature of from about 40° C. to about 45° C.

TABLE 3

EFFECT OF BEATING AFTER SULFONATION

| Sample No. | Sulfur Content | Beating Time | Freeness | Bulk | Dry Tensile | Wet Tensile | Wet/Dry Tensile | Dry Stretch | Wet Stretch |
| --- | --- | --- | --- | --- | --- | --- | --- | --- | --- |
| 1 | 0 | 0 | 765 | 3.19 | 1554 | 89 | 5.7 | 0.7 | 1.90 |
| 2 | 0 | 30 | 730 | 2.26 | 5517 | 197 | 3.6 | 1.9 | 0.80 |
| 3 | 0 | 60 | 710 | 2.00 | 7508 | 248 | 3.3 | 2.5 | 0.60 |
| 4 | 0 | 120 | 640 | 1.92 | 9735 | 353 | 3.6 | 3.2 | 0.40 |
| 5 | .22 | 0 | 745 | 3.66 | 2711 | 779 | 28.7 | 1.1 | 1.1 |
| 6 | .22 | 30 | 730 | 2.57 | 5810 | 1726 | 29.7 | 1.8 | 1.2 |
| 7 | .22 | 60 | 705 | 2.62 | 6077 | 1896 | 31.2 | 1.9 | 1.3 |
| 8 | .22 | 120 | 675 | 2.44 | 7150 | 2510 | 35.1 | 2.2 | 1.5 |
| 9 | 0.43 | 0 | 745 | 3.10 | 4799 | 1386 | 28.9 | 1.6 | 1.5 |
| 10 | 0.43 | 30 | 735 | 2.72 | 6046 | 1942 | 32.1 | 1.9 | 1.7 |
| 11 | 0.43 | 60 | 725 | 2.50 | 6877 | 2412 | 35.1 | 2.0 | 1.7 |
| 12 | 0.43 | 120 | 700 | 2.34 | 6871 | 2375 | 34.6 | 1.9 | 1.7 |

TABLE 4

EFFECT OF REFINING PRIOR TO SULFONATION

| Sample No. | Refining Time | Sulfur Content | Bulk | Dry Tensile | Wet Tensile | Wet/Dry Tensile |
| --- | --- | --- | --- | --- | --- | --- |
| 1 | — | — | 3.19 | 1554 | 89 | 6 |
| 2 | 30 | — | 2.26 | 5517 | 197 | 4 |
| 3 | 30 | .25 | 2.61 | 4904 | 1270 | 26 |
| 4 | 30 | .30 | 2.68 | 6691 | 2086 | 31 |
| 5 | 120 | — | 1.92 | 9735 | 353 | 4 |
| 6 | 120 | .25 | 1.93 | 9149 | 3232 | 35 |
| 7 | 120 | .37 | 1.87 | 10141 | 4084 | 40 |

8. The method of claim 1 wherein the oxidation is carried out at a pH of from about 3 to about 4.6.

9. The method of claim 1 wherein the sulfonation agent is selected from the group consisting of an alkali bisulfite and a combination of sodium hydroxide and sulfur dioxide.

10. The method of claim 1 wherein the sulfonation agent is sodium bisulfite.

11. The method of claim 1 wherein the sulfonation reaction is carried out at a temperature of from about 25° C. to about 90° C.

12. The method of claim 1 wherein the sulfonation reaction results in a sulfonic group degree of substitution of from about 0.01 to about 0.1.

13. The method of claim 1 wherein the sulfonation reaction results in a sulfonic group degree of substitution of from about 0.01 to about 0.04.

14. A method of making sulfonated cellulose fiber comprising the steps of:
  (a) oxidizing cellulose fiber with sodium metapedodate to form aldehydo cellulose; and
  (b) sulfonating the oxidized cellulose with sodium bisulfite to form sulfonated cellulose having a sulfonic group degree of substitution of about 0.005 or greater, wherein the sulfonated cellulose comprises a sulfur atom bonded directly to cellulose.

15. The method of claim 14 wherein the degree of substitution is from about 0.01 to about 0.1.

16. The method of claim 14 wherein the degree of substitution is from about 0.01 to about 0.04.

17. The method of claim 14 wherein the oxidation reaction is carried out at a temperature of from about 20° C. to about 55° C., a pH of from about 3 to about 4.6 and a sodium metaperiodate concentration of from about 0.01M to about 0.2M.

18. The method of claim 14 wherein the sulfonation reaction is carried out at a temperature of from about 40° C. to about 90° C., a pH of from about 3 to about 4.5 and a sodium bisulfite concentration of from about 1 to about 10 weight percent based on the dry weight of the fiber.

19. A method for making sulfonated cellulose fiber comprising the steps of:
  (a) oxidizing cellulose fiber with sodium metapedodate having a concentration of from about 0.01M to about 0.2M at a temperature of from about 20° C. to about 55° C. and at a pH of from about 3.0 to about 4.6 to form aldehydo cellulose;
  (b) washing the oxidized cellulose fiber with water; and
  (c) sulfonating the oxidized cellulose with sodium bisulfite having a concentration of from about 1 to about 10 weight percent based on the dry weight of the fiber at a temperature of from about 25° C. to about 90° C. and at a pH of from about 3 to about 4.5, wherein the sulfonated cellulose has sulfonic group degree of substitution of from about 0.01 to about 0.1, and wherein the sulfonated cellulose comprises a sulfur atom bonded directly to cellulose.

20. The method of claim 19 wherein the sodium metaperiodate is reacted with the cellulose fiber for about ½ hour or more.

21. The method of claim 19 wherein the sodium bisulfite is reacted with the oxidized cellulose for about ½ hour or more.

22. The method of claim 19 wherein the cellulose fiber is mechanically refined prior to oxidation.

23. The method of claim 19 wherein the cellulose fiber is mechanically refined after sulfonation.

24. The method of claim 1, 14 or 19 wherein the cellulose fiber is eucalyptus.

25. The method of claim 1, 14 or 19 wherein the cellulose fiber is secondary fiber.

26. A sulfonated cellulose fiber made by the method of claim 1, 14 or 19.

27. A sulfonated cellulose fiber having a sulfonic group substitution of about 0.005 or greater, wherein the sulfonated cellulose comprises a sulfur atom bonded directly to cellulose.

28. The sulfonated cellulose fiber of claim 27 having a sulfonic group degree of substitution of from about 0.01 to about 0.1.

29. The sulfonated cellulose fiber of claim 27 having a sulfonic group degree of substitution of from about 0.01 to about 0.04.

30. The sulfonated cellulose fiber of claim 27 wherein the fiber is a eucalyptus fiber.

31. The sulfonated cellulose fiber of claim 27 wherein the fiber is a secondary fiber.

32. A paper sheet comprising sulfonated cellulose fiber having a sulfonic group degree of substitution of from about 0.008 to about 0.08, wherein the sulfonated cellulose comprises a sulfur atom bonded directly to cellulose, said paper sheet having a wet over dry tensile strength ratio of from about 0.15 to about 0.40 without a wet strength agent.

33. The paper sheet of claim 32 having a wet strength of about 600 grams per inch or greater.

34. The paper sheet of claim 32 having a wet strength of about 1000 grams per inch or greater.

* * * * *